Nov. 13, 1962
R. H. SCHATZ ET AL
3,063,857
SOLVENT REPLACEMENT
Filed Feb. 29, 1960
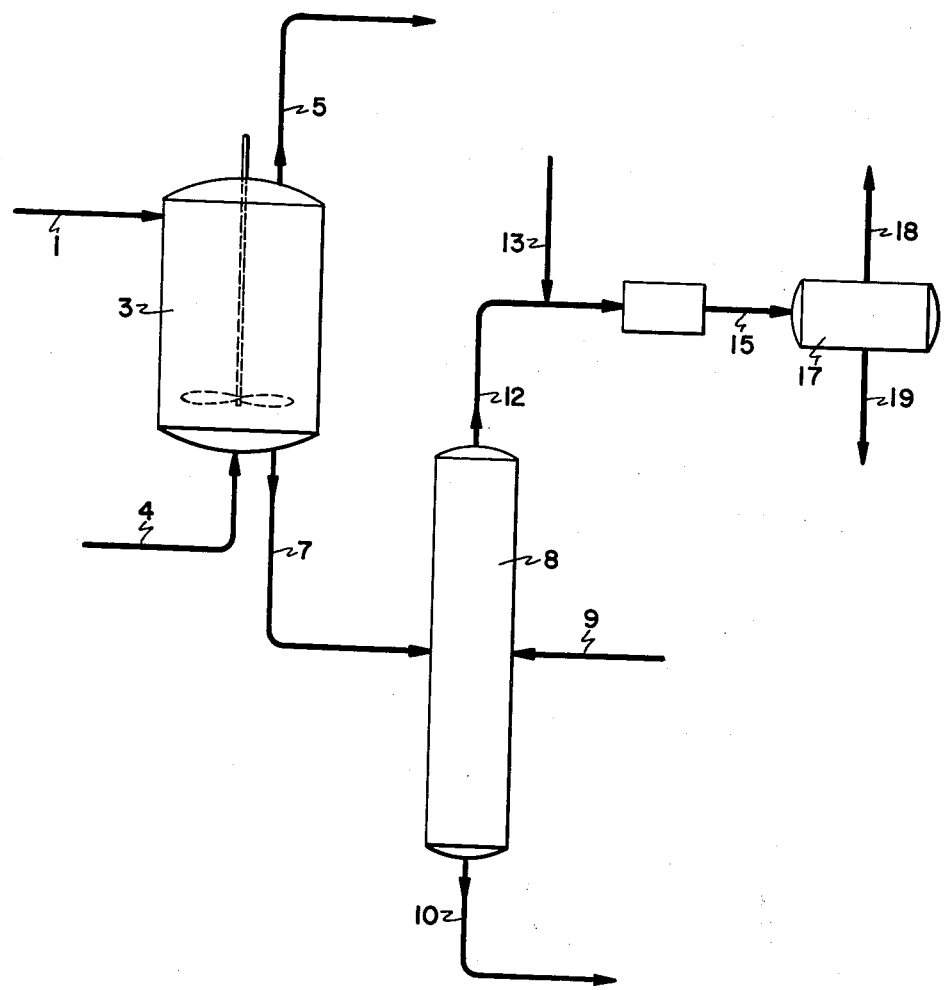
Ralph H. Schatz
Anthony H. Gleason    Inventors
Ober C. Slotterbeck
By  Patent Attorney

# United States Patent Office 3,063,857
Patented Nov. 13, 1962

3,063,857
SOLVENT REPLACEMENT
Ralph H. Schatz, Westfield, Anthony H. Gleason, Scotch Plains, and Ober C. Slotterbeck, Clark, N.J., assignors to Esso Research and Engineering Company, a corporation of Delaware
Filed Feb. 29, 1960, Ser. No. 11,743
10 Claims. (Cl. 106—237)

This invention relates to the preparation of an improved oxidized polymer with less acids, peroxides, and other oxygenated contaminates therein and more particularly it is concerned with a method for replacing the solvent which is used to provide this oxidized polymer.

It is known that a liquid homopolymer of a $C_4$ to $C_6$ conjugated diolefin or a liquid copolymer of a $C_4$ to $C_6$ conjugated diolefin and a minor amount of ethylenically unsaturated monomer such as styrene can be prepared with alakali metal catalysts. It is also known that these homopolymers or copolymers can be blown with air to incorporate oxygen into their structure. In the past, the oxidation has been conducted in aromatic diluents, such as xylene or $C_9$ aromatic hydrocarbons. Diluents which are predominantly aliphatic or naphthenic in nature are not entirely satisfactorily because of incompatibility with the oxidized polymer in the oxidation process.

Provision of the oxidized polymer in aromatic solvent is sometimes disadvantageous, e.g., where the oxidized polymer is used as a surface coating which is flame cured and the attendant soot formation from combustion of the aromatic solvent causes imperfections in the coating surface; or where the polymer is used in roller coating applications and dissolution of the aromatic solvent into rubber and plastic rolls is destructive to the equipment; or where a solvent of specific volatility other than that obtainable with aromatic solvents is desired. For these applications, and the like, provision of the oxidized polymer in solvents, such as ketones, esters, alcohols, ethers and halogenated aromatic hydrocarbons is desirable. However, the use of ketones, esters, alcohols, ethers and halogenated aromatic hydrocarbons as the diluent in the oxidation of the polymer is not acceptable due to oxidative degradation which causes highly contaminated and corrosive polymer product solutions therefrom. Moreover, the use of polyalkylated aromatic diluents, e.g., $C_8$, $C_9$ and higher boiling aromatics, in the oxidation step is not desirable, since oxidative degradation will also occur with the conditions which are employed in the process.

It has now been discovered that these disadvantages can be overcome by a solvent replacement technique which results in the production of an oxidized polymeric solution containing a substantially lower amount of aliphatic or aromatic acids, peroxides, and other oxygenated products therein. Thus, in accordance with one embodiment of this invention, a polymer of a $C_4$ to $C_6$ conjugated diolefin is prepared, such as the copolymer of butadiene with styrene and the homopolymer of butadiene. This polydiolefin is then blown with air in the presence of a relatively low boiling aromatic solvent, e.g., benzene, to incorporate oxygen in its structure. Subsequently, this oxidized polymeric solution is introduced into a fractionating zone wherein the relatively low boiling solvent is replaced with a solvent having a relatively high boiling point, e.g., Solvesso 100 (a $C_9$ aromatic hydrocarbon mixture boiling from about 150 to about 175° C.). The resulting solution comprising oxidized polydiolefin in the replacement solvent as considerably less aromatic acids, peroxides, and other oxygenated products therein resulting from diluent degradation.

The polymeric oils within the purview of this invention are prepared from diolefins, particularly those which are conjugated and have 4 to 6 carbon atoms per molecule, such as butadiene, hexadiene, isoprene, 2-dimethyl butadiene, 1-3 piperylene, and methyl pentadiene. Diolefins may be used which are copolymerized with minor amounts of ethylenically unsaturated monomers as styrene, acrylonitrile, methyl vinyl ketone, or with styrenes having alkyl groups substituted on the ring, e.g., paramethyl styrene and dimethyl styrene.

A preferred diolefin polymeric oil is one prepared by reacting 75 to 100 parts of butadiene-1,3 and 25 to 0 parts of styrene in the presence of metallic sodium catalyst. This, therefore, includes the homopolymer of butadiene or the copolymer of butadiene with the styrene. Polymerization is carried out in a reaction diluent at temperatures from about 25° C. to 105° C. preferably between 40° and 85° C. with about 0.5 to 5 parts of finely divided sodium per 100 parts of monomers used. The diluent used in the polymerization must boil between about −15° C. and 200° C., and should be used in amounts ranging from 100 to 500 parts per 100 parts of monomers; prefered diluents are aliphatic hydrocarbons such as solvent naphtha or straight-run mineral spirits such as Varsol. It is also desirable to employ about 10–40 parts of an ether promoter per 100 parts of monomers, and they may be used in addition to or in place of the hydrocarbon diluent. The use of the ethers is highly desirable since they improve the reproducibility of the process, control the molecular weight of the polymer, shorten the induction period, and are particularly effective in producing a substantially colorless product. Ethers which may be used consist of $C_4$ to $C_8$ aliphatic ethers or cyclic ethers and polyethers other than those having a —O—C—O— grouping; particularly useful ethers are dioxane-1,4 and diethyl ether. Finally, it is beneficial to use about 5 to 35 weight percent, based on sodium, of an alcohol such as methanol, isopropanol, or an amyl alcohol in order to activate the catalyst. When polymerization is completed the catalyst is destroyed and removed from the polymer solution. The resulting product may vary in viscosity from 0.15 to 20 poises. The preparation of this oil in the presence of an alkali metal or peroxide catalyst is described in U.S. Patents Nos. 2,762,851 and 2,586,594, which are incorporated herein by reference.

After removing essentially all of the polymerization diluents by stripping to give a polymer of essentially 100% NVM, these polymeric oils are then oxidized by blowing them with air or oxygen in the presence of an aromatic solvent in a kettle-type reactor, a packed tower, or other suitable gas-liquid contacting device. In accordance with the instant invention, the aromatic solvent must have a boiling point at least 10° F. below that of the replacement solvent, and preferably does not form an azeotropic mixture with the replacement solvent. Suitable solvents for the oxidation of the polymer include benzene, toluene, ethylbenzene and xylene. However, the preferred solvent is benzene. In order to incorporate oxygen in the structure, the polydiolefin is air blown in the presence of catalysts which are generally organic salts of metals such as cobalt, lead, iron, and manganese. However, the preferred catalysts are naphthanates, octoates, and oleates which are used within the range of 0.001% to 1.0 wt. percent based on polymer. The preferred oxidized polydiolefins are the copolymers of 75 to 85% butadiene and 25 to 15% styrene with about 10 to 20% oxygen in their structures.

The invention may be understood from the following description in conjunction with the accompanying drawing in which the figure demonstrates the process for air blowing a polydiolefin in an aromatic solvent with a relatively low boiling point and subsequently replacing the solvent with one which has a relatively high boiling point.

Referring now to the figure, a polymeric solution comprising a polydiolefin in benzene is introduced into reactor 3 through line 1 where it is subsequently blown with air which has been introduced through line 4. From the reactor overhead the spent air stream containing benzene vapors, water, carbon dioxide, volatile acids such as formic and acetic acid, etc., is withdrawn by means of line 5. From the bottom of reactor 3 is withdrawn a solution comprising the oxidized polydiolefin and benzene. This solution is transported by line 7 to fractionating zone 8, wherein the replacement solvent is introduced through line 9, either on the same tray on which the oxidized polydiolefin in benzene is introduced or on a higher tray. This replacement solvent has a boiling point at least 10° F. higher than benzene and can be an aromatic hydrocarbon, ketone, ester, ether, halogenated aromatic hydrocarbon or an alcohol. However, preferred replacement solvents are xylene, Solvesso 100, methyl isobutyl ketone, butyl acetate, butyl ether, chlorobenzene and amyl alcohol. This replacement solvent will boil between 185° F. and 450° F. and will generally be employed in the range of 25 to 100 parts, preferably 30 to 55 parts per 100 parts of oxidized polymer in the low boiling solvent. Benzene is recovered overhead in line 12 where it is washed with water which has been introduced through line 13. This water washing is performed to remove light acids such as formic, acetic, and the like which are formed during the oxidation of the polydiolefin. These acids are removed by transporting the water-washed benzene through line 15 to settler 17. From the top of settler 17 the benzene is withdrawn through line 18 for recycling purposes and from the bottom is withdrawn by means of line 19 a water purge with the acids therein. From the bottom of fractionating zone 8 is withdrawn the oxidized polymer in the replacement solvent. The content in the oxidized polymeric solution of aromatic acids, peroxides and other degradation products from the diluent used in the oxidation step is relatively low. The acid number, in terms of milligrams of KOH per gram of polymer, of the oxidized polymeric solution is below 25 when the oxidized polymer has 10% oxygen incorporated in its structure and below 35 when the oxidized polymer contains 16% oxygen. Prior to this invention, the corresponding acid numbers were considerably higher. The acids represented by these acid numbers are largely acid groupings which are a part of the polymer molecules as evidenced by the low corrosivity of the oxidized polymer solutions.

Thus in accordance with the present invention it is now possible to provide a solution comprising an oxidized polydiolefin in a more desirable solvent such as a ketone, ester, aromatic hydrocarbon, chlorinated aromatic hydrocarbon, or alcohol which contains a substantially lower content of oxygenated products therein. Therefore, this material can now be utilized in applications where previously it was unacceptable, due to the physical properties of the solvent used in the oxidation, or due to the extent of contamination with oxygenated degradation products therein.

The following examples are submitted to illustrate but not to limit this invention. Unless otherwise indicated, all parts and percentages in the specification are based upon weight.

*Example I*

A polymeric oil was provided from the compounds indicated herebelow:

| | Parts |
|---|---|
| Butadiene-1,3 | 80 |
| Styrene | 20 |
| Naphtha [1] | 100 |
| Dioxane | 20 |
| Isopropanol | 0.2 |
| Sodium [2] | 1.5 |

[1] Straight-run mineral spirits: API gravity, 56.2; flash, 30° F.; boiling range, 206° to 230° F.; aniline point 103° F. solvent power, 37 kauri-butanol value (reference scale: Benzene-100 K.B. value, n-heptane 25.4 K.B. value).
[2] Dispersed to a particle size of 10 to 50 microns by means of a Premier dispersator.

The polymerization was performed at 50° C. in a 2-liter autoclave equipped with a mechanical agitator. Complete conversion was obtained in 4.5 hours. The catalyst was destroyed and removed from the resulting crude product. Essentially all of the solvent was removed by stripping to give a product of essentially 100% NVM. The resulting product had a viscosity of 1.5 poises measured at 50% NVM in Varsol solution and the nonvolatile portion thereof had an average molecular weight of about 8,000.

A polymeric solution was then provided in a reactor comprising 30.0% of the above copolymer and benzene. The solution was blown with air for 3.17 hours at a temperature of 253° F. and a pressure of 100 p.s.i.g. in the presence of 100 p.p.m. of manganese, as the naphthenate (based on polymer) as a catalyst to incorporate 9.8% oxygen in the structure of the copolymer. The solution comprising 33.3 parts of oxidized polymer, 70 parts of benzene, and having an acid number lower than 10, based on solution, was introduced into a fractionating tower. Forty-one parts of methyl isobutyl ketone was introduced into the fractionating tower as the replacement solvent on the same tray as the oxidized polymer solution. From the tower overhead was withdrawn 69.8 parts of benzene, 0.2 part methyl isobutyl ketone; and from the bottom of the tower was withdrawn 33.3 parts of the oxidized polymer, 40.8 parts of methyl isobutyl ketone, 0.2 part benzene. This end product had an acid number below 25 based on polymer.

This example demonstrates that an aromatic hydrocarbon solvent which is refractory to oxidation, such as benzene, can be used advantageously as the diluent for the oxidation of a liquid polydiolefin and that this diluent can be replaced with a more desirable higher boiling diluent, such as methyl isobutyl ketone, by a solvent replacement technique to give a final oxidized polymer solution which is uncontaminated with oxidation products. Since methyl isobutyl ketone is easily oxidized, it is a desirable diluent for the final oxidized polymer solution, but an unsatisfactory diluent for the oxidation process.

*Example II*

The data herebelow illustrates the increased resistance to oxidation exhibited by aromatic diluents as the number of methyl groups appended to the aromatic ring is reduced. Samples were oxidized for 2 hours with air at 240° F. and 100 p.s.i.g. pressure using 0.01 wt. percent of manganese naphthenate as a catalyst. The oxidized samples were washed with water to remove low boiling and water soluble oxygenated products which would be removed by distillation when concentrating the oxygenated polymer solution under normal procedures.

| Oxidized Solvent | Direct Oxygen, wt. Percent | Peroxides, p.p.m. | Acid No., mg. KOH/gm. |
|---|---|---|---|
| Solvesso 100 (C₉ aromatic) | 1.71 | 1,280 | 6.58 |
| Xylene | 0.65 | 192 | 2.42 |
| Benzene | less than 0.1 | negligible | less than 0.5 |

Thus by using the more refractory lower boiling aromatic hydrocarbons such as benzene or toluene as diluents for the oxidation, substantially lesser amounts of aromatic acids, peroxides and other oxygenated products are formed.

Having set forth the general nature and specific embodiments of the present invention, the true scope is now particularly pointed out in the appended claims.

What is claimed is:
1. A process which comprises preparing a liquid polymer of a $C_4$ to $C_6$ conjugated diolefin; blowing said polymer with air in the presence of an aromatic first solvent with a boiling point below 350° F. to incorporate up to 20% oxygen in its structure; adding a second solvent for the oxidized polymer, said solvent having a boiling point of at least 10° F. above that of said first solvent of the oxidized polymer-first solvent composition, subjecting the combined solvents-oxidized polymer composition to fractionation to remove a substantial amount of the said first solvent as overhead and recovering the second solvent-oxidized polymer as bottoms from said reaction, said bottoms having an acid number of less than 35 mg. KOH/gm. of polymer.

2. The process according to claim 1 in which the polymer is selected from the group consisting of the homopolymer of butadine and the copolymer of butadiene with styrene.

3. The process according to claim 1 in which the first solvent is selected from the group consisting of benzene, toluene, ethyl benzene, and xylene.

4. The process according to claim 1 in which the second solvent is selected from the group consisting of an ester, ether, ketone, aromatic hydrocarbon, chlorinated aromatic hydrocarbon, and an alcohol.

5. The process according to claim 1 in which the oxidized polymer is the copolymer of 75 to 85% butadiene with 25 to 15% styrene with 10 to 20% oxygen incorporated therein.

6. The process according to claim 1 in which the first solvent is benzene.

7. The process according to claim 1 in which the first solvent is toluene.

8. The process according to claim 4 in which the second solvent is selected from the group consisting of methyl isobutyl ketone, butyl ether, butyl acetate, amyl alcohol, chlorobenzene, and xylene.

9. A process which comprises preparing a copolymer of butadine with styrene; blowing said copolymer with air in the presence of benzene to incorporate 16% oxygen in its structure; adding as a second solvent for the oxidized copolymer, a mixture of $C_9$ aromatic hydrocarbons having a boiling range between about 150 and about 175° C., subjecting the resultant composition to fractionation to remove benzene as an overhead condensate and recovering the $C_9$ aromatic hydrocarbons-oxidized copolymer composition as an end product, said recovered composition having an acid number of less than 35 mg. KOH/gm. of copolymer.

10. The process according to claim 9 in which the oxygen content is 10% and the acid number in the end product is less than 25.

References Cited in the file of this patent

UNITED STATES PATENTS

| 2,366,361 | Semon et al. | Jan. 2, 1945 |
| 2,369,058 | Legafski | Feb. 6, 1945 |
| 2,371,342 | Mayfield | Mar. 13, 1945 |
| 2,842,452 | Koenecke et al. | July 8, 1958 |
| 2,908,585 | Koenecke | Oct. 13, 1959 |

FOREIGN PATENTS

| 885,886 | France | Sept. 28, 1943 |